United States Patent [19]
Coli

[11] Patent Number: 5,452,355
[45] Date of Patent: Sep. 19, 1995

[54] TAMPER PROTECTION CELL

[75] Inventor: Vincent J. Coli, Mountain View, Calif.

[73] Assignee: VLSI Technology, Inc., San Jose, Calif.

[21] Appl. No.: 190,419

[22] Filed: Feb. 2, 1994

[51] Int. Cl.⁶ ............................................. G11B 23/28
[52] U.S. Cl. .................................. 380/4; 380/50; 364/DIG. 1; 364/DIG. 2; 364/246.6; 364/969.4; 364/246.9; 364/969.3
[58] Field of Search ............... 380/3, 4, 50; 364/200, 364/900, 246.6, 246.9, 969, 969.4, 969.3

[56] References Cited

U.S. PATENT DOCUMENTS

| | | | |
|---|---|---|---|
| 4,523,271 | 6/1985 | Levian | 364/200 |
| 4,723,224 | 2/1988 | Van Hulett et al. | 365/49 |
| 4,849,927 | 7/1989 | Vos | 364/900 |
| 5,377,264 | 12/1994 | Lee et al. | 380/4 |
| 5,377,343 | 12/1994 | Yaezawa | 380/3 |

OTHER PUBLICATIONS

"pFSB Library Elements", Product Bulletin, VLSI Technology, Inc., 6 pages, dated Dec. 1992.
"512x1 And 512x32 vROM Programmable Blocks", Product Bulletin, VLSI Technology, Inc., 4 pages, dated Dec. 1992.

Primary Examiner—Gilberto Barrón, Jr.
Attorney, Agent, or Firm—Patrick C. Keane

[57] ABSTRACT

The present invention is directed to providing a level of security on a chip which makes accessing stored data so burdensome that it is outweighed by the cost of merely purchasing the chip through conventional, legal avenues. In accordance with the present invention, secure data stored in a circuit cannot be accessed without destroying circuit operation, nor can the circuit be reverse engineered without significant time, cost and expense. For example, where the secure data stored on an ASIC includes a data encryption key, the key cannot be accessed or be modified to create a new key without destroying circuit operation.

20 Claims, 2 Drawing Sheets

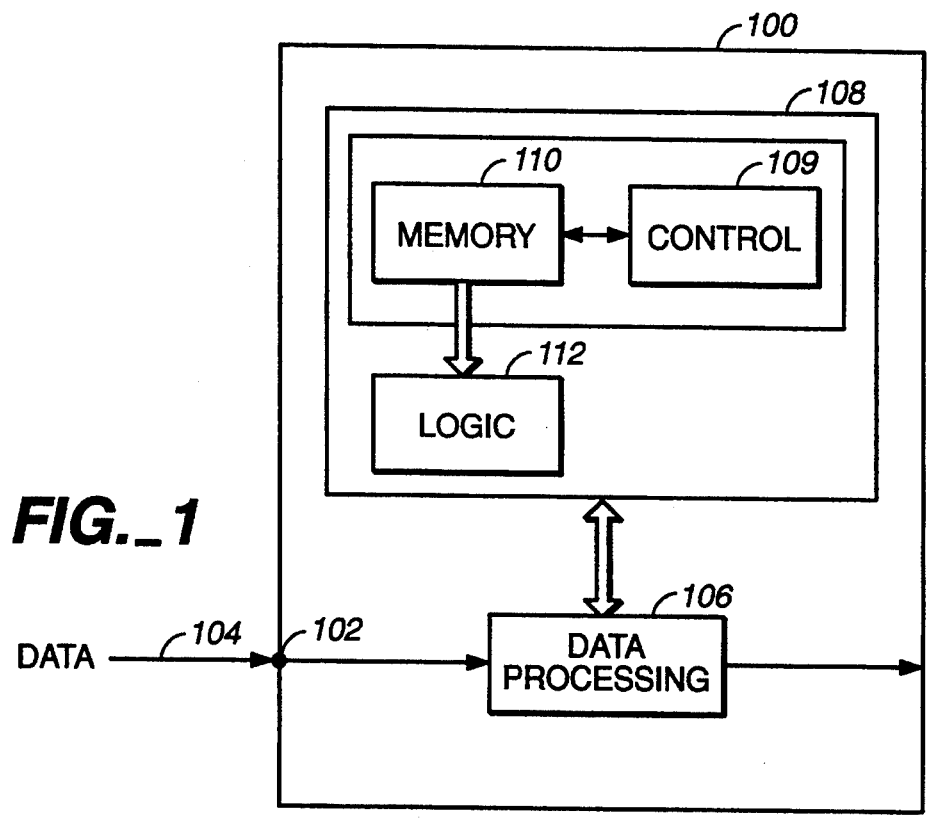
FIG._1
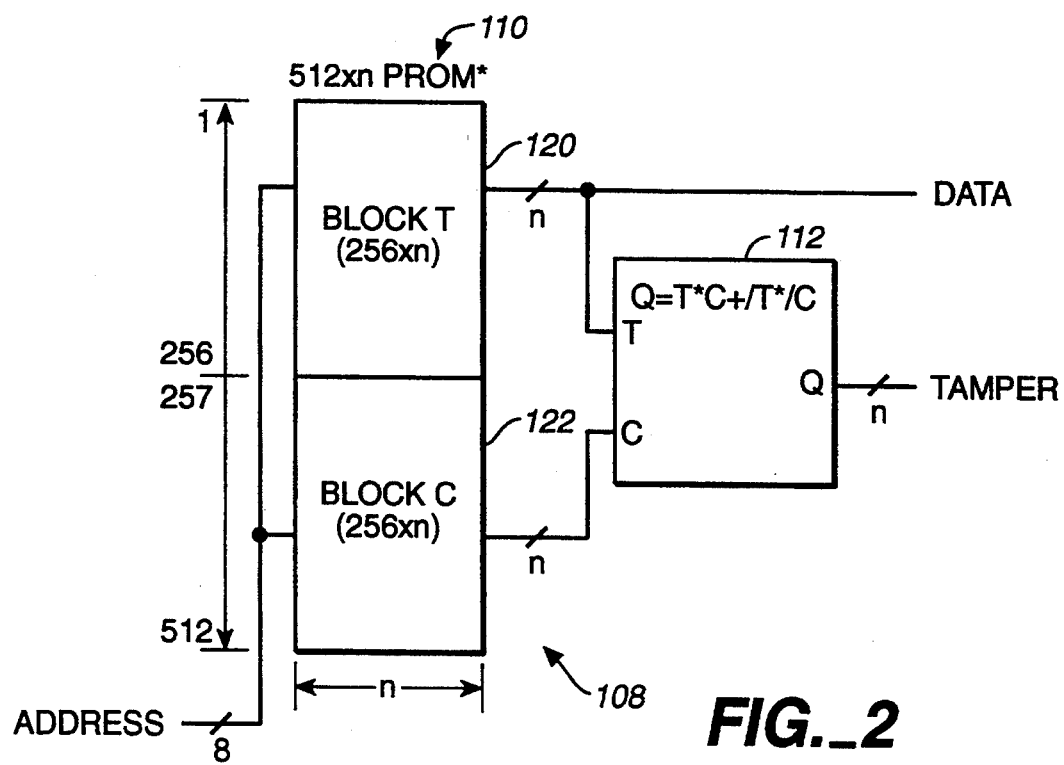
FIG._2

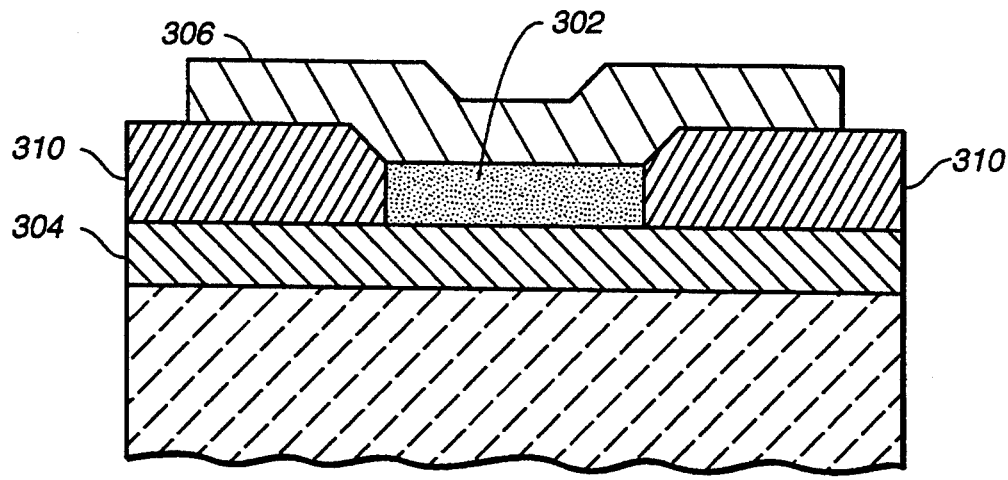
FIG._3A
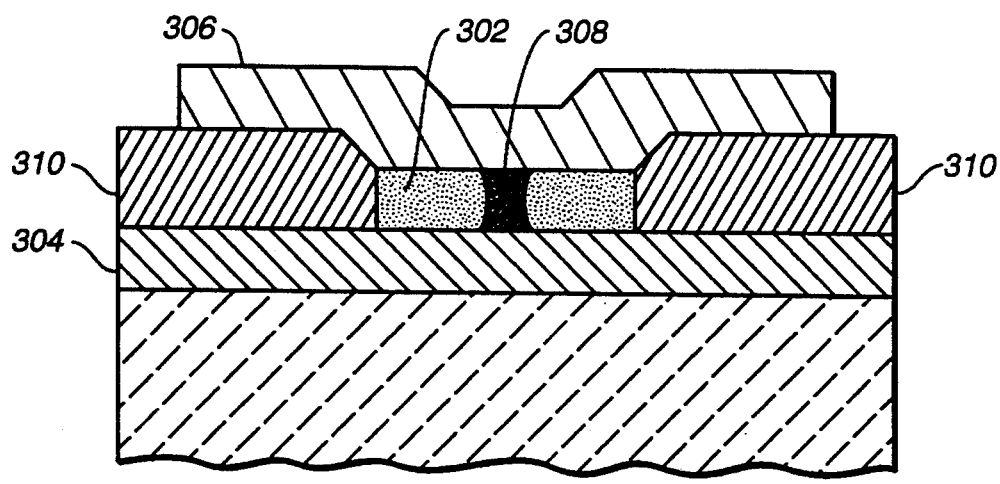
FIG._3B

TAMPER PROTECTION CELL

BACKGROUND OF THE INVENTION

1. Field of the Invention

The present invention relates generally to circuit design, and more particularly, to providing security for data stored on integrated circuits such as application specific integrated circuits (ASICs).

2. State of the Art

It is well known to design circuits, such as ASICs, with internal security features to inhibit access to stored data. For example, ASICs have been designed with data encryption chips for encoding or decoding data stored in the chip. A data encryption key is included on the chip, and the key must be used to properly decode the data stored on the chip. Electrical measures for further enhancing internal security of stored data include eliminating external access to memory address circuitry of the chip to render it difficult to read out code.

In some cases, a hierarchy of both physical security measures and internal security measures are used to provide plural layers of protection and to ensure the highest security of stored data. For example, physical security measures include forming one or more protective layers over a memory device, such as a read only memory (ROM), a programmable read only memory (PROM) or an erasable PROM (i.e., EPROM), to limit visual access to the memory even if the material used to encapsulate the chip is removed. Other known security techniques include using polysilicon layers to carry signals (thereby rendering signal transmission invisible). Criss-crossing of signal paths on a multi-layer chip can also be used to wind conductive paths through multiple layers such that removal of an upper layer eliminates any possibility of probing signal paths located in lower layers.

While the foregoing techniques, in addition to other well known techniques, provide a relatively high level of both internal and physical security for data stored on a chip, the widespread pirating in the market place makes it necessary to continue to develop more stringent levels of security.

SUMMARY OF THE INVENTION

The present invention is directed to providing a level of security which makes accessing stored data so burdensome that it is outweighed by the cost of merely purchasing the chip and accompanying system through conventional, legal avenues. In accordance with the present invention, secure data stored on an integrated circuit cannot be accessed without destroying circuit operation, nor can the integrated circuit be reverse engineered without significant time, cost and expense. For example, where the secure data stored on an ASIC includes a data encryption key, the key cannot be accessed or modified to create a new key without destroying circuit operation.

In exemplary embodiments, the present invention relates to devices and methods which include means for receiving data; means for storing at least a portion of the data as first data; means for generating second data having a predetermined relationship to the first data (e.g., the second data can be the digital complement of the first data), the data storing means having at least a first portion for storing the first data and a second portion for storing the second data; and means for logically combining the first data with the second data to generate a tamper control signal.

In exemplary embodiments where received data is encoded using a data encryption key, memory space on an ASIC can be saved by generating a tamper control signal only if an attempt is made to modify the data encryption key (e.g., in an effort to access stored data). In such embodiments, the device includes means for receiving data, means for processing the received data, and means for providing a data encryption key for use by the data processing means. The means for providing a data encryption key can further include means for storing at least a portion of the data encryption key as first data, the data storing means having at least a first portion for storing the first data and a second portion for storing second data, the second data having a predetermined relationship to the first data (e.g., the second data can be the digital complement of the first data). Further, the data encryption key providing means can include means for logically combining the first data with the second data to generate a tamper control signal. The tamper control signal can be used to deactivate the device upon any attempt to either download the data encryption key, reverse engineer the data encryption key or to create a new key.

Thus, exemplary embodiments of the present invention which use a data encryption key can include a circuit having means for providing at least a portion of a data encryption key as first data, the data encryption key providing means having a data storing means with at least a first portion and a second portion; means for generating second data which is stored in the second portion of the data storing means and which has a predetermined relationship to the first data (e.g., digital complement); and means for logically combining the first data with the second data to generate a tamper control signal for the circuit.

BRIEF DESCRIPTION OF THE DRAWINGS

Other objects and advantages of the present invention will become more apparent from the following detailed description of preferred embodiments when read in conjunction with the accompanying figures wherein:

FIG. 1 shows an exemplary integrated circuit for decoding encrypted data using a security cell in accordance with an exemplary embodiment of the present invention;

FIG. 2 illustrates an exemplary embodiment of a security circuit in accordance with an exemplary embodiment of the present invention; and FIGS. 3A and 3B illustrate a ViaLink ™, available from VLSI Technology, Inc. of San Jose, Calif., for use in conjunction with the present invention.

DETAILED DESCRIPTION OF THE PREFERRED EMBODIMENTS

FIG. 1 illustrates an exemplary embodiment of a security cell, or tamper protection cell, for preventing unauthorized access to information stored on an integrated circuit having a memory device (e.g., a ROM or PROM). The FIG. 1 cell includes a data encryption/decryption device, the device being generally represented by element 100.

Those skilled in the art will recognize that the inclusion of a data encryption/decryption device is not necessary to benefit from the advantages of the present invention. Where a data encryption/decryption device is not included, the unencoded data which is to be secured on the chip can be used to generate a tamper control signal in accordance with the present invention. However, for purposes of illustration, the following discussion will focus on the storage of encoded data on an integrated circuit and the use of the data encryption/decryption key to generate a tamper control signal.

Referring to FIG. 1, exemplary embodiments of the present invention include a means for receiving data (e.g., digital data) generally represented as an input port 102. A data stream is received by input port 102 via an input line 104. The data received at the input port 102 is conditioned and input to a means for processing the data, such as a data encryption circuit 106.

Those skilled in the art will recognize that uncoded data received at the input port 102 is encoded using the data encryption key of the data encryption circuit 106. The encoded data is stored, and can only be properly decoded using the data encryption key. Although the FIG. 1 circuit is designed to both encode data received by the circuit and to decode data transmitted by the circuit, those skilled in the art will appreciate that the data encryption circuit 106 can be exclusively used either to encode or to decode received data.

The FIG. 1 device 100 further includes a means for providing a data encryption key, generally represented as element 108. The data encryption key providing means includes, in an exemplary embodiment, a means for storing data (e.g., digital data, such as binary digital signals). For example, the data storing means can be a PROM 110. The data storing means includes at least two portions, with a first portion being provided for storing at least a portion of the data encryption key as first data, and with a second portion being provided for storing second data, the second data having a predetermined relationship (e.g., the digital complement) with the first data.

Those skilled in the art will appreciate that where received data is merely to be stored in an unencoded form without use of a data encryption/decryption key, the data storing means would not form part of a data encryption key providing means. Rather, the data storing means would merely receive the input data directly. Any portion of the input data which is to be maintained secure can be stored as the first data. A complement of the first data can then be generated as the second data.

In an exemplary embodiment where digital data is stored, the digital complement of the first data can be generated outside the device 100 and then stored in the second portion. Alternately, the storing means (e.g., PROM 110) can include generating means 109 for automatically generating the digital complement of the first data at the time the first data is received and stored on the device. The generating means can be either software or hardwired logic for producing a digital complement of the first data and then programming the second portion of the storing means (e.g., program the PROM to store the digital complement).

In an exemplary embodiment, the phrase "digital complement" can be considered to represent the generation of a binary "0" in bit locations of the second digital data which correspond to bit locations of the first digital data where a binary "1" has been stored. Similarly, binary "0" bit locations of the first digital data correspond to binary "1" bit locations of the second digital data. However, those skilled in the art will appreciate that the phrase "complement" need not be so narrowly construed. Rather, any predetermined relationship between the first data and the second data (e.g., two's complement) can be used to generate a tamper control signal in accordance with the present invention; it is not necessary that every bit location of the first data and the second data possess complementary binary values (e.g., less than all bit locations of the first and second digital data can be used to generate the tamper control signal), or that binary values even be used.

In accordance with exemplary embodiments of the present invention, the data storing means, such as the PROM 110, includes fuse technology for storing digital data which is to be secured. As referenced herein, "fuse technology" refers to use of both fuse links and anti-fuse links. An anti-fuse link represents an open circuit which, during a memory programming phase is fused to close a conductive path to a cell of the memory circuit. The closing of this path results in the cell being driven to a predetermined logic state (e.g., logic high) to program that memory cell with a logic level high. Fuse links can be used in similar fashion. As referenced herein, a fuse link refers to a closed circuit which is opened during programming to drive a memory cell to a predetermined logic state (e.g., drive the logic state to a logic level zero upon programming).

The fuse links and anti-fuse links described above are collectively known as ViaLinks TM, available from VLSI Technology, Inc. and QuickLogic Corp., both of San Jose, Calif. These devices can be embedded into ASIC devices and programmed in one direction to store data. A fuse link or anti-fuse link which is programmed (i.e., driven) to a predetermined logic state (e.g., logic level high) cannot be reprogrammed to its original state (e.g., a logic level low).

FIGS. 3A and 3B illustrate an anti-fuse link in both an unprogrammed state (FIG. 3A) and in a programmed state (FIG. 3B). Programming of the FIG. 3a anti-fuse link can be performed in a known manner by directing a voltage higher than normal operating voltage of the chip to change a high resistance, undoped amorphous (i.e., non-crystalline) silicon 302 (sandwiched with an inter-metal oxide 310 between two conductive metal layers 304 and 306), into a conducting polysilicon 308 (FIG. 3B). The programmed anti-fuse link forms a conductive interconnection between the two metal layers. The anti-fuse link is therefore a high resistance insulator in its unprogrammed state (i.e., for fuse technology, this corresponds to the programmed state). Once programmed, the anti-fuse link becomes a permanent bi-directional, low resistance connection (a programmed fuse link becomes high resistance). A typical low resistance value is less than 100 ohms, while the high resistance state is typically greater than $2.5 \times 10^9$ ohms.

Because such fuse and anti-fuse links cannot be visually inspected to distinguish their programmed state from their unprogrammed state, they offer enhanced security (i.e., visual security); a person viewing a chip which includes these links cannot determine which elements have been programmed and which elements remain unprogrammed. The use of fuse technology also allows enhanced field programmability. For example, users can specify encryption keys on location so that secure operation can be further ensured.

In accordance with exemplary embodiments of the present invention, the data storing means used to store the first and second data is formed as part of an ASIC device based on high-speed CMOS technology. The data storing means (e.g., PROM) includes programmable fuse technology formed, for example, in readily available high-speed field programmable gate arrays (e.g., FPGAs available from QuickLogic Corp. of San Jose, Calif.).

Referring again to FIG. 1, the data encryption key providing means further includes means 112 for logically combining the first data with the second data. Those skilled in the art will recognize the first data can be the entire data encryption key or any portion thereof. It is only significant that bits of the data encryption key actually used to establish the first data have a predetermined relationship (e.g., complementary) with predetermined data (e.g., bit) locations of the second data. The logical combining means designated 112 is used to generate a tamper control signal. In embodiments where a data encryption key is not used, the logical combining means can combine data which is to be maintained secure, or any portion thereof, with the second data to generate the tamper control signal.

During normal operation of the FIG. 1 circuit, data is received via the input port 102 by the data encryption circuit 106. The data encryption circuit 106 accesses the key from the data encryption key providing means 108 to properly encode data. Alternately, the data encryption key can be accessed to decode data to be output from the circuit. If any attempt is made to reverse engineer the device 100 (e.g., reverse engineer the data encryption key by attempting to reprogram the PROM while monitoring outputs of the device 100), the data encryption key providing means will generate the tamper control signal and deactivate the overall device.

The manner by which a tamper control signal is generated for the exemplary FIG. 1 embodiment will be described more fully with respect to FIG. 2. Those skilled in the art will appreciate that the generation of the tamper control signal can be readily adapted to generating a tamper control signal where a data encryption key is not included.

FIG. 2 illustrates an exemplary data encryption key providing means 108. The FIG. 2 data encryption key providing means includes means for storing data, the data storing means being generally represented as a digital memory 110 (e.g., PROM 110 having a plurality of memory cells). The data storing means includes at least a first portion 120 and a second portion 122. In the exemplary FIG. 2 embodiment, the data storing means is a 512 by n bit PROM, with the first portion being a 256 by n PROM and with the second portion being a 256 by n bit PROM. The storing means 110 can, for example, be a PROM implemented anti-fuse link technology.

The FIG. 2 data encryption key providing means further includes means for controlling the data storing means such that second data is stored in the second portion of the data storing means, the second data being the digital complement of the first data. The control means can, in an exemplary embodiment, include a generating means on board the PROM 110 to automatically generate (e.g., via software or hardware) the second digital data. Thus, the second digital data can be generated and stored at the same time the first digital data is received. For example, a programming technique can be used whereby at the time the data encryption key is stored into the first portion 120, a complement of each bit is generated (e.g., using an inverter for each bit) and stored in the second portion 122.

In the foregoing example, digital data representing a 256 by n data encryption key is stored in the first portion 120. The digital complement of the data encryption key is then input to the second portion 122. The first and second digital data used to generate a tamper control signal can, however, be generated using any portion of the data encryption key and its complement, or by using any data which is to be stored and maintained secure on the chip. If, for example, less than the entire data encryption key is used, then only a complement of that portion used is generated.

The means 112 for logically combining the first data with the second data generates a tamper control signal. In an exemplary embodiment, the logical combining means is generally represented as a logic circuit for implementing a predetermined logic function. In accordance with an exemplary embodiment, the logic circuit implements the following logic function:

$$Q = T^*C + /T^*/C$$

wherein T represents true first data corresponding to at least a portion of the data encryption key stored in the first portion 120 and C represents the complementary second data stored in the second portion 122. The values /T and /C correspond to the inverse of T and C, respectively with "/" denoting a Boolean invert operator. The symbol "*" denotes a Boolean AND operator, the symbol "+" denotes a Boolean OR operator, and Q implements the equivalence function f(T,C), often referred to as an exclusive NOR operator in Boolean algebra.

The logic circuit thus includes software control or a hardware implementation for ANDing the true data from the first portion 120 with the complementary data from the second portion 122. This result is logically ORed with the result of ANDing the inverted first data (i.e., /T) with the inverted second data (i.e., /C). In the exemplary embodiment described above where each bit of the second data is the binary opposite of a corresponding bit in the first data, the result of the logic function should be a string of zeros (i.e., logic level lows). Any logic high signal generated at the Q output of the logic circuit is considered to signal an attempt to reverse engineer or to tamper with the circuit (e.g., reverse engineer by reprogramming the data encryption key and monitoring the circuit output). The Q output of the logic circuit can be used to generate a tamper control signal for shutting down the circuit as well as any components of the circuit (e.g., the data encryption device of FIG. 1).

Any effort to reverse engineer the secure data (e.g., the data encryption key) or to establish a new key is typically performed by programming a previously unprogrammed fuse link (or anti-fuse link). In accordance with the present invention, any attempt to program an unprogrammed fuse link will result in a memory cell associated with that fuse link being driven to its programmable logic state. However, the complementary memory cell in the second portion 122 of the memory cannot be similarly programmed since fuse links can only be programmed in one direction. Accordingly, the fact that a given memory cell in the first portion 120 has been programmed, but that the corresponding memory cell in the second portion 122 cannot be returned to its original logic state will result in a logic inconsistency within the logical combining means. The Q output of the security cell will therefore produce a tamper control signal indicating an attempt to tamper with the secure data (i.e., the data encryption key).

The logic cell of the FIG. 2 circuit can further include a storage device (e.g., flip-flop) for storing a tamper control signal which has been generated during the operation phase. In this sense, the operation phase refers to any period of using the chip after it has been originally programmed to store secure data (e.g., a data encryption key). The tamper control signal which has been stored in a flip-flop can then be used for deactivating any portion of the circuit desired.

In accordance with the present invention, enhanced security of data stored within a memory device can be significantly improved. For example, attempts to tamper with the secured data in an effort to reverse engineer the data or to establish a new data encryption key would impart serious hardship, rendering unauthorized use of the circuit costly and inefficient.

Those skilled in the art will readily appreciate that the above described embodiments are exemplary only, and that other embodiments of the invention can be used to further enhance security. For example, only select data (e.g., bits) of the first and second memory portions 120 and 122 need be compared to produce the tamper control signal. Further, techniques such as redundant polling can be used to select specific memory cell logic from the first and second portions for comparison in the logic circuit. An odd number of comparisons can be performed to avoid a hung jury situation.

Further, alternate techniques for evaluating the data received from the first and second portions 120 and 122 can include, for example, majority voting logic whereby a tamper control signal is only generated when a set threshold of errors in the comparisons of specific memory cells is detected (e.g., a predetermined number of bit errors between the first and second data). Further, redundant security chips can be used to provide an even greater number of comparisons in generating the tamper control signal.

In yet another advantageous embodiment of the invention, the logical combining means 112 can include a linear feedback shift register to select memory cell locations in the first and second portions 120 and 122 for comparison. In addition to the comparison described above, other types of comparisons can be performed to generate the tamper control signal as well. For example, the logical combining means can be replaced with addition circuits to add the outputs of the first and second portions in the memory and to compare the output with predetermined numbers representing expected results. Any discrepancies between the expected results and the adder output can be used to generate the tamper control signal. Those skilled in the art will appreciate that numerous alternate logical combinations of the data (or at least portions of the data) stored in the first portion of the memory can be made with at least portions of the data stored in the second portion of the memory, the data in the second portion having a predetermined relationship with respect to the data in the first portion, to generate the tamper control signal.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A circuit comprising:
   means for storing at least a portion of a data encryption key as first data, said data storing means having at least a first portion for storing said first data and a second portion;
   means for generating a complement of said first data as second data which is stored in said second portion of said data storing means; and
   means for logically combining said first data with said second data to generate a tamper control signal.

2. A circuit according to claim 1, wherein said data storing means is a read-only memory having a plurality of memory cells.

3. A circuit according to claim 1, wherein said storing means includes a programmable fuse link to establish a conductive path for driving a memory cell of the storing means to a given logic state.

4. A circuit according to claim 1, wherein said storing means includes a programmable anti-fuse link to establish a conductive path for driving a memory cell of the storing means to a given logic state.

5. A circuit according to claim 3, wherein said circuit is operated during a programming phase to store data in said storing means, and subsequently operated during an operation phase to access said stored data, and wherein said logical combining means includes:
   a flip-flop for identifying when an unprogrammed fuse link has been programmed during said operation phase.

6. A circuit according to claim 1, wherein said logical combining means further includes:
   means for logically combining said first data with said second data to produce a first output signal;
   means for inverting said first data and for inverting said second data;
   means for logically combining said inverted first data with said inverted second data to produce a second output signal; and
   means for logically combining said first and said second output signals to provide said tamper control signal.

7. A circuit according to claim 6, wherein said means for logically combining said first data with said second data to produce a first output signal, and said means for logically combining said inverted first data with said inverted second data to produce said output signal are AND gates.

8. A circuit according to claim 6, wherein said means for logically combining said first and second output signals is an OR gate.

9. A circuit according to claim 1, wherein said generating means includes a plurality of programmable fuse or anti-fuse links which can be programmed from a first logic state to a second logic state, but which cannot be re-programmed to said first logic state once having been programmed to said second logic state.

10. A circuit according to claim 1, wherein said storing means is a field programmable gate array.

11. A circuit according to claim 1, wherein said tamper control signal deactivates said circuit when said second data no longer corresponds to a digital complement of said first data.

12. A data encryption device comprising:
    means for receiving data;
    means for processing the received data;

means for providing a data encryption key for use by said data processing means, said means for providing a data encryption key further including:
  means for storing at least a portion of the data encryption key as first data, said data storing means having at least a first portion for storing the first data and a second portion for storing second data, said second data having a predetermined relationship with said first data; and
  means for logically combining said first data with said second data to generate a tamper control signal.

13. A device according to claim 12, wherein said tamper control signal deactivates the device when said second data fails to correspond to a digital complement of said first data.

14. A circuit comprising:
  means for receiving data;
  means for storing at least a portion of the data as first data, the data storing means having at least a first portion for storing the first data and a second portion for storing second data, the second data having a predetermined relationship with the first data; and
  means for logically combining the first data with the second data to generate a tamper control signal.

15. A circuit according to claim 14, further including:
  means for generating a digital complement of said first data as said second data.

16. A circuit according to claim 14, wherein said storing means includes a programmable fuse link to establish a conductive path for driving a memory cell of the storing means to a given logic state.

17. A circuit according to claim 14, wherein said storing means includes a programmable anti-fuse link to establish a conductive path for driving a memory cell of the storing means to a given logic state.

18. A circuit according to claim 16, wherein said circuit is operated during a programming phase to store digital data in said digital storing means, and subsequently operated during an operation phase to access said stored digital data, and wherein said logical combining means includes:
  a flip-flop for identifying when an unprogrammed fuse link has been programmed during said operation phase.

19. A circuit according to claim 14, wherein said logical combining means further includes:
  means for logically combining said first data with said second data to produce a first output signal;
  means for inverting said first data and for inverting said second data;
  means for logically combining said inverted first data with said inverted second data to produce a second output signal; and
  means for logically combining said first and said second output signals to provide said tamper control signal.

20. A circuit according to claim 14, wherein said storing means includes a plurality of programmable fuse or anti-fuse links which can be programmed from a first logic state to a second logic state, but which cannot be re-programmed to said first logic state once having been programmed to said second logic state.

* * * * *